United States Patent Office 3,658,736
Patented Apr. 25, 1972

3,658,736
WATER-SOLUBLE COATING COMPOSITIONS
Wolfgang Daimer, Graz, and Gerfried Klintschar, Weiz, Austria, assignors to Vianova Kunstharz Aktiengesellschaft, Vienna, Austria
No Drawing. Continuation-in-part of application Ser. No. 841,619, July 14, 1969. This application Jan. 30, 1970, Ser. No. 7,215
Claims priority, application Austria, Feb. 3, 1969, A 1,042/69
Int. Cl. C08g 5/20
U.S. Cl. 260—19                                    9 Claims

ABSTRACT OF THE DISCLOSURE

Coating compositions characterized in that they are water-soluble upon neutralization comprising (A) carboxy group containing reaction products of alpha-beta ethylenically unsaturated carboxylic acids and/or dicarboxylic acids and/or anhydrides and/or semi-esters and/or semi-amides with diene polymers and unmodified and/or modified unsaturated fatty acids with more than 8 C atoms; (B) one or more heat-reactive condensation products of formaldehyde with phenol carboxylic acids, which, if desired, can be etherified and further, if desired, condensation products of formaldehyde with phenols and/or ureas and/or aminotriazines can be co-employed; and, optionally, (C) one or more polyhydroxy compounds with at least two hydroxy groups and a molecular weight of between 50 and 3000 are described. The compositions, while being quick drying, are not overly sensitive to oxidation permitting through drying of coatings.

This application is a continuation-in-part application of U.S. Ser. No. 841,619 filed July 14, 1969.

FIELD OF INVENTION AND PRIOR ART

The present invention is directed to a variation of the water-soluble coating compositions described in the aforesaid Ser. No. 841,619 and essentially embraces coating compositions which are water-soluble upon neutralization and comprise a reaction product of a diene polymer and an unsaturated fatty acid with an alpha-beta ethylenically unsaturated carboxylic acid or a derivative thereof. These compositions, while being fast drying, permit through drying.

As set forth in application Ser. No. 841,619, coating compositions containing reaction products of diene polymers with maleic anhydride have a tendency to skin during storage due to the oxygen reactivity which is higher than that of adducts only containing drying oils. Coatings produced from such compositions dry too fast at the surface and, thus, the oxidative through drying is insufficient.

The coating compositions of application Ser. No. 841,619 contain:

(A) One or more carboxy groups containing reaction products of diene polymers with alpha-beta ethylenically unsaturated carboxylic acids/or dicarboxylic acids and/or anhydrides and/or semi-esters and/or semi-amides;

(B) One or more, optionally etherified heat-reactive condensation products of formaldehyde with phenol carboxylic acids, optionally co-employing condensation products of formaldehyde with phenols and/or ureas and/or amino-triazines; and optionally, (C) One or more polyhydroxy compounds with at least two hydroxy groups and a molecular weight of between 50 and 3000.

Through the use of component (B) and, optionally, component (C), the oxygen reactivity of the coating composition is substantially reduced.

GENERAL DESCRIPTION OF INVENTION

It has now been found that by modifying the above compositions whereby component (A) is a joint reaction product of diene polymers, modified or unmodified unsaturated fatty acids with more than 8 C atoms and an alpha-beta ethylenically unsaturated carboxylic acids and/or dicarboxylic acids and/or anhydrides and/or semi-esters and/or semi-amides, the reaction product containing carboxyl groups, the resultant coating compositions show a very low oxygen reactivity. Accordingly, the subject matter of the present invention is a coating composition, water-soluble upon neutralization, including components as follows:

(A) Carboxy group containing reaction products of alpha-beta ethylenically unsaturated carboxylic acids and/or dicarboxylic acids and/or anhydrides and/or semi-esters and/or semi-amides with diene polymers and unmodified and/or modified unsaturated fatty acids with more than 8 C atoms;

(B) One or more heat-reactive condensation products of formaldehyde with phenol carboxylic acids, which, if desired, can be etherified and further, if desired, condensation products of formaldehyde with phenols and/or ureas and/or aminotriazines can be co-employed; and optionally, (C) One or more polyhydroxy compounds with at least two hydroxy groups and a molecular weight of between 50 and 3000.

The co-employment of the fatty acids or derivatives thereof which have less unsaturation than the diene polymers is a simple means for reducing the degree of unsaturation of component (A). This modification of component (A) allows a reduction in the amounts of component (B) needed or the elimination of component (B) from the composition altogether. This leads to a further improvement of the coating compositions, i.e., to better mechanical properties and to less danger of disproportioning in electrodeposition baths.

The diene polymers suitable for the invention are those polymers of conjugated dienes listed in application Ser. No. 841,619, e.g., polymers of butadiene-1,3 and/or 2-methylbutadiene-1,3 and/or 2,3 - dimethylbutadiene-1,3 and/or chloroprene, and the like; optionally with other co-polymerizable monomers, such as styrol, alpha-methylstyrol, o-, m-, or p-chlorostyrol, vinylnaphthalene, vinylcyclohexane, vinylcyclohexene, vinylacetate, (meth) acrylic esters, (meth)acrylonitrile, and the like. These polymers have molecular weights of from about 200 and 20,000 and substantially contain isolated double bonds which can be partially hydrogenated. The preparation of such polymers is known in the art.

The preferred unsaturated fatty acids with more than 8 C atoms are those constituting the drying or semi-drying vegetable and fish oils, as well as rosin and tall oil. "Modified fatty acids," as used herein, embrace the dimers, trimers, and polymers of the aforesaid acids and their copolymers with monomers, such as styrol, vinyltoluol, (meth)acrylic esters, (meth)acrylic acid, cyclopentadiene, (meth)acrylamide, (meth)acrylonitrile; their reaction products with phenol formaldehyde condensates, their cyclized derivatives with pyron structure (Farbe and Lack, 64, 16/1958); their esters with mono- or polyhydric alcohols and epoxides, as well as optionally their partial esters with polyols, which have been condensed with di- and/or polycarboxylic acids or with isocyanates to form products with a hydroxyl number of below 5. The use of ester-free fatty acid modification products makes it possible to produce coating compositions which are admirably suited for electrodeposition.

Suitable alpha-beta ethylenically unsaturated carboxylic acids are (meth)acrylic acid, maleic acid, maleic anhydrides, maleic acid semi-esters, maleic acid monoamide, fumaric acid, and itaconic acid.

In preparing component (A), the unsaturated fatty acid, the diene polymer and the preferably employed maleic anhydride are heated to temperatures of from about 150 to 250° C. If modified fatty acids are used, these are modified first in a separate working step.

The preferred component (B) are resol carboxylic acids obtained in known manner by condensing formaldehyde with phenol carboxylic acids, e.g., 2-(4-hydroxyphenyl)-2-(carbethoxyphenyl)-propane or 4,4-bis(4-hydroxyphenyl)-pentanoic acid or paracarbethoxyphenol, optionally after partial or complete etherification of the methylol groups. Condensation products of formaldehyde with phenols, such as p-tertiary butylphenol, 2,2-bis-(4-hydroxyphenyl)propane, or the aforesaid with urea, thiourea, melamine, benzo-quanamine, etc., optionally after etherification with low alcohols, can be co-employed. When co-employing aminoplast components, the stoving temperatures of the coating compositions can be reduced. This component (B) will be present at from about 6 to 15 percent of component (A) calculated as solid substances.

Suitable components (C) are compounds which have such a high volatility at the hardening temperatures of the coating compositions of the invention that they contribute to the formation of a cured film. Such organic compounds can be ethylene glycol, propylene glycol, butylene glycol, neopentyl glycol, glycerol, trimethylol propane, pentaerythritol, epoxy-free derivatives of ethers of diphenylol propane and epichlorohydrin, e.g., their partial esters with fatty acids; furthermore, amine alcohols, e.g., triethanol amine, N,N,N',N' - tetrakis-(2-hydroxypropyl)-ethylene diamine; hydroxy-group containing polymers obtained, e.g., by polymerization of allyl alcohol or (meth)acrylic acid monoethyleneglycol ester, optionally with other alpha-beta ethylenically unsaturated monomers (e.g., styrol, vinyl toluol, (meth)acrylic ester, vinyl acetate, (meth)acrylamide, (meth)acrylnitrile), or by reaction of ethylene oxides with preformed carboxy group containing polymers. Furthermore, coating compositions with specific properties are obtained, if the polyhydroxy compound is partially reacted with isocyanates such that the final product contains at least two hydroxy groups.

The components as defined above can be chemically combined by careful condensation at temperatures up to 150° C. Such a chemical combination is of advantage, if components (B) or (C) have limited or no solubility in water.

Examples of suitable water-tolerant solvents which can be employed in the coating composition are alcohols such as methanol, ethanol, (iso)propanol, sec. butanol, tert. butanol; semi-ethers of glycols, e.g., ethylene glycol monoethyl ether, ethylene glycol monomethylether, ethylene glycol mono(iso)propyl ether, ethylene glycol monobutyl ether; and keto-alcohols, e.g., diacetone alcohol.

Suitable bases for neutralizing the products of the invention are ammonia, primary, secondary, and tertiary alkyl amines, e.g., (iso)propyl amine, butyl amine, amyl amine, diethyl amine, diisopropylamine, dibutyl amine, morpholine, piperidine, trimethyl amine, triethyl amine, as well as alkanol amines, e.g., diisopropanolamine, dimethylethanolamine, as well as alkylene polyamines, e.g., ethylene diamine, diethylene triamine, triethylenetetramine, and the like. When using the coating compositions of the invention for electrodeposition paints, the neutralizing agents can also be alkali and/or alkaline earth hydroxides or salts of such acids, the dissociation constant of which is lower than that of the resins of the invention, as long as they form water-soluble soaps with the latter, optionally in the presence of water-tolerant solvents. Examples of such suitable salts of weakly dissociated acids are alkali carbonates and alkali carbamates.

The coating compositions of the invention can be employed, pigmented or unpigmented, according to all common application methods.

Particularly when electrodepositing the coating compositions of the invention, the obtained coatings exhibit superior corrosion resistance to salt spray and industrial atmospheres. A special advantage of the coatings of the invention is the fact that this outstanding protection against corrosion is also obtained on untreated steel. Thus, expensive pre-treatment by passivating or phosphatizing, as is usual in the mass production of coated metal articles, can be omitted.

SPECIFIC EMBODIMENTS

The following examples illustrate the invention without limiting its scope. Parts are by weight if not otherwise stated.

Example 1

|  | G. |
|---|---|
| Distilled dehydrated castor oil fatty acid | 200 |
| Polybutadiene (80% cis-configuration, molecular weight about 3000) | 200 |
| Maleic anhydride | 100 |
| Cu-naphthenate, in xylol (1% metal) | 20 | are charged into a suitable reaction vessel equipped with reflux cooler, stirrer and thermometer, and heated to 200° C., maintaining an inert gas sparge. The mass is held at 200° C. for three hours. After cooling to 80° C., 30 g. water are added while maintaining the temperature at 80° C. and held for two hours. Then the batch is diluted to 70 percent solids with ethylene glycol monoethyl ether.

Upon addition of 100 g. carboxylic resol at 54 percent solids [this resol is prepared by heating 360 g. formaldehyde, 36 percent; 106 g. triethyl amine and 286 g. 4,4-bis-(4-hydroxyphenyl)-pentanoic acid to 80° C. If necessary, the pH-value of the mixture is adjusted to 7.7–8.0 (measured 1:10 in distilled water). The mass is held at 80° C. for 10 hours and cooled ] and 20 g. trimethylol propane, a 70 percent resin solution is obtained.

Preparation of a primer

A pigment paste is prepared in known manner from:

|  | G. |
|---|---|
| Resin solution, 70% | 143 |
| TiO$_2$ rutile type | 75 |
| Lithopone (paint quality, zinc oxide-free) | 65 |
| Microtalcum | 5 |
| Carbon black | 2 |
| Lead silico chromate | 13 |

The paste is neutralized with ammonia to a pH-value of 7.8 (measured as a 10 percent solution in distilled water) and diluted with water to application viscosity. The resulting paint is applied to zinc phosphated steel panels by spraying or dipping. Stoving schedule: 30 minutes at 160° C.

The stoved film has the following properties: salt spray resistance ASTM B 117–61: below 4 mm. after 530 hours; slow indentation (Erichsen): 7.8 mm.

Example 2

|  | G. |
|---|---|
| Tall oil fatty acid (20% rosin acid content) | 265 |
| Para-tertiary butylphenol resol [1] | 76 |

[1] Prepared from 46 g. paratertiary butylphenol and 91 g. formaldehyde by heating in the presence of an alkaline catalyst such as triethyl amine at 80° C. If necessary, the pH-value of the mixture is adjusted to 7.7 to 8.0. The mass is held at 80° C. until a clear resin solution is obtained and then cooled.

are condensed for 1 hour, with reaction water separating, at 220° C. After cooling to 200° C.,

|  | |
|---|---|
| Cu-naphthenate solution in xylol (1% metal) | 12 |
| Maleic anhydride | 120 |
| Polybutadiene (80% cis-configuration, molecular weight about 1500) | 190 | are added while keeping the temperature at about 200° C. and held at this temperature until the content of free maleic anhydride has fallen to zero. After cooling to 80° C., a mixture of:

| | G. |
|---|---|
| Diacetone alcohol | 60 |
| Triethyl amine | 1 |
| Distilled water | 25 | is added. The batch is held at 80° C. and stirred for 2 hours, and then diluted with 200 g. ethylene glycol monoethyl ether. Then 74 g. of carboxylic resol at 54 percent solids (prepared as in Example 1 above) are added. A 65 percent resin solution is obtained.

Preparation of an electrodeposition paint

On a triple roll mill a mill base is prepared from:

| | G. |
|---|---|
| Resin solution, 65% | 154 |
| TiO₂, rutile type | 20 |
| Red iron oxide | 7 |
| Aluminum silicate | 13 |

The paste is neutralized with triethyl amine to a pH-value of 7.5 and is diluted with deionized water to a solid content of 10–15 percent. The paint is deposited electrophoretically in known manner on degreased steel and stoved for 30 minutes at 180° C.

Varnish properties

| | |
|---|---|
| Film thickness | 20 microns. |
| Salt spray resistance (ASTM B 117–61) on mild steel | Below 4 mm. after 300 hours. |
| Impact test (1 kg. ball from 1 m.) | Good. |

Example 3

120 g. distilled dehydrated castor oil fatty acid having a viscosity of 40 cp./20° C. are heated to 280° C. under inert gas until the viscosity has risen to 1500 cp./20° C. To this polymerized fatty acid:

| | G. |
|---|---|
| Cu-naphthenate solution in xylol (1% metal) | 12 |
| Maleic anhydride | 100 |
| Polybutadiene (80% cis-configuration, molecular weight about 1500) | 280 | are added at 200° C. and held at this temperature until the content of free maleic anhydride has fallen to zero. After cooling to 80° C., a mixture of:

| | G. |
|---|---|
| Diacetone alcohol | 55 |
| Distilled water | 40 |
| Triethyl amine | 2 | is added and the batch is stirred for 2 hours at 80° C. Then the resin is diluted with 150 g. ethylene glycol monoethyl ether. 50 g. carboxylic resol [this resol is prepared by dissolving 228 g. 2,2-bis-(4-hydroxyphenyl)-propane in 500 ml. 2 N sodium hydroxide by warming. Then a solution of 110 g. sodium-monochloroacetate (technical) in 170 g. water is added. The temperature is slowly raised to 60–90° C. and is held for about one hour. The batch is stirred continuously. The acid number of the part of a sample which is freed from alkali by acidification and which is soluble in a mixture of toluol and butanol shows that about 85 percent of the bisphenol have reacted. 200 g. formaldehyde, 35 percent, are added to the mass and the resulting clear solution is held at about 40° C. for three days. The mixture of resols is precipitated with the calculated quantity of hydrochloric acid in the presence of 100 g. butanol. After several washings, about 500 g. of butanolic solution with an acid number of about 140 mg. KOH/g. are obtained. The solid content is about 65 percent. After neutralization with ammonia the solution is dilutable with water to any desired extent] are added. A 65 percent resin solution is obtained.

Analogous to Example 2, a paint is prepared. The obtained film properties are equally good.

Example 4

To 173 g. tall oil fatty acid with 1 percent rosin acid content, 43 g. styrol and 1 g. di-tertiary butyl peroxide are added while holding the temperature at 160° C. The addition was over a period of 90 minutes. Over an additional period of 2 hours the temperature is raised to 300° C. and held for an additional 4 hours.

After cooling to 100° C., 100 g. maleic anhydride, 12 g. Cu-naphthenate solution in xylol (1% metal) and 264 g. polybutadiene (80% cis-configuration, molecular weight about 1500) are added. The temperature is raised to 200° C. and held until the content of free maleic anhydride has fallen to zero.

At 90° C., the batch is hydrolyzed for 2 hours with 20 g. water and 1 g. triethyl amine. The resin is neutralized with ammonia until it has become completely soluble in water (pH-value about 7.3) and is diluted with distilled water to a solids content of 40 percent.

250 g. of this resin solution (40%) are pigmented with 30 g. TiO₂ and 0.5 g. carbon black and diluted with 700 g. water (distilled).

The electrophoretic deposition is carried out in known manner on degreased steel. The obtained film properties are analogous to Example 2.

Example 5

In order to demonstrate the improvement by the modification of the invention, the following resin is prepared: 400 g. polybutadiene (80% cis-configuration, molecular weight about 1500) are heated to 200° C. together with 12 g. Cu-naphthenate and 100 g. maleic anhydride, until the content of free maleic anhydride has fallen to zero. After cooling to 90° C., the adduct is hydrolyzed for 2 hours at 90° C. with 20 g. water and 2 g. triethyl amine.

The resin solution is pigmented and neutralized as described in Example 2.

COMPARISON OF THE PROPERTIES OF ELECTRODEPOSITED COATINGS

| | Before stoving | After stoving |
|---|---|---|
| Example 2 | Dense, dry coating, adhesive, well rinsable. | Smooth film adhesive, hard. |
| Example 3 | | |
| Example 4 | | |
| Example 1 of U.S. Serial No. 841,619. | | |
| Example 5 | Gel-like coating, no adhesion, badly rinsable. | Wrinklish film, bad through-hardening, bad adhesion. |

It is claimed:
1. A coating composition characterized in that it is water soluble upon neutralization comprising
   (A) a reaction product obtained by heating
      (a) a reaction product of (a-1) a butadiene polymer of a member of the group consisting of butadiene - 1,3; 2 - methylbutadiene - 1,3; 2,3-dimethylbutadiene-1,3, and chloroprene, said polymer having a molecular weight of from 200–20,000, and (a-2) an unsaturated oil fatty acid having more than 8 carbon atoms and an iodine number of at least 80, with
      (b) an alpha, beta-ethylenically unsaturated carboxylic acid or its anhydride, semi-ester, semi-amide or mixtures thereof,
   the proportions of (a-1), (a-2), and (b) being controlled to provide a reaction product carrying carboxyl groups, and
   (B) from about 6–15 percent of (A), calculated as solid substances of a heat-reactive or resol condensation product of formaldehyde with phenol carboxylic acids.

2. Coating compositions according to claim 1 wherein the unsaturated fatty acids are employed as dimers, trimers, and polymers thereof.

3. Coating compositions according to claim 1 wherein the unsaturated fatty acids are employed as co-polymers thereof with cyclopentadiene.

4. Coating compositions according to claim 1 wherein the unsaturated fatty acids are employed as the reaction products of said acids with phenol-formaldehyde condensation products.

5. Coating compositions according to claim 1 wherein in component (A) rosin is co-employed.

6. The process of electrodepositing the coating compositions of claim 1 upon a support.

7. The composition of claim 1 wherein the butadiene polymers contain about 80 percent cis-configuration.

8. The composition of claim 1 wherein the alpha,beta-ethylenically unsaturated acid is a dicarboxylic acid.

9. The composition of claim 1 wherein the alpha,beta-ethylenically unsaturated carboxylic acid anhydride is maleic anhydride.

References Cited

UNITED STATES PATENTS

| | | | |
|---|---|---|---|
| 2,981,710 | 4/1961 | Hoenel | 260—29.3 |
| 3,230,162 | 1/1966 | Gilchrist | 260—29.3 |
| 3,298,985 | 1/1967 | Bills | 260—845 |
| 3,340,172 | 9/1967 | Huggard | 260—29.3 |
| 3,351,675 | 11/1967 | Gilchrist | 260—845 |
| 3,410,818 | 11/1968 | Yurcick | 260—845 |

DONALD E. CZAJA, Primary Examiner

W. E. PARKER, Assistant Examiner

U.S. Cl. X.R.

204—181, 182; 260—29.3, 839, 840, 845